(12) United States Patent
Summers et al.

(10) Patent No.: US 6,294,004 B1
(45) Date of Patent: Sep. 25, 2001

(54) STRUCTURES FOR ELECTROSTATIC V-BANK AIR FILTERS

(75) Inventors: George Robert Summers, Carleton Place (CA); Forwood Cloud Wiser, III, Kingston, NJ (US)

(73) Assignee: Engineering Dynamics Ltd., Ontario (CA)

( * ) Notice: Subject to any disclaimer, the term of this patent is extended or adjusted under 35 U.S.C. 154(b) by 0 days.

(21) Appl. No.: 09/473,042

(22) Filed: Dec. 21, 1999

(51) Int. Cl.$^7$ .................................................. B03C 3/155
(52) U.S. Cl. ........................... 96/66; 55/493; 55/DIG. 12; 55/DIG. 31; 96/94; 96/97
(58) Field of Search ................................. 96/66, 67, 83, 96/94, 97, 98, 100, 84; 55/493, 501, 506, 484, 521, DIG. 12, DIG. 31

(56) References Cited

U.S. PATENT DOCUMENTS

| | | | |
|---|---|---|---|
| 2,044,221 | * 6/1936 | Myers et al. | 55/DIG. 31 |
| 3,249,228 | * 5/1966 | Arvanitakis | 55/DIG. 12 |
| 3,520,115 | * 7/1970 | Bowen | 55/493 X |
| 3,691,736 | 9/1972 | Neumann | 55/484 |
| 4,193,780 | 3/1980 | Cotton, Jr. et al. | 55/378 |
| 4,501,598 | * 2/1985 | Long | 96/66 X |
| 4,886,526 | 12/1989 | Joannou | 55/131 |
| 5,059,218 | 10/1991 | Pick | 55/131 |
| 5,080,699 | 1/1992 | Ho et al. | 55/179 |
| 5,108,470 | * 4/1992 | Pick | 96/66 X |
| 5,298,044 | * 3/1994 | Sutton et al. | 55/DIG. 12 |
| 5,512,074 | * 4/1996 | Hanni et al. | 55/DIG. 31 |
| 5,573,577 | * 11/1996 | Joannou | 96/66 |
| 5,695,535 | * 12/1997 | Hintenlang et al. | 55/484 X |
| 5,846,302 | * 12/1998 | Putro | 96/66 |
| 5,914,413 | * 6/1999 | Andersson et al. | 55/493 X |
| 6,030,427 | * 2/2000 | Sorice et al. | 55/493 X |
| 6,077,334 | * 6/2000 | Joannou | 96/97 X |

* cited by examiner

*Primary Examiner*—Richard L. Chiesa
(74) *Attorney, Agent, or Firm*—James W. Kayden; Thomas, Kayden, Hostmeyer & Risley

(57) ABSTRACT

Structures for V-bank electrostatic air filters are described. The V-bank air filters are assembled from two side panels, perforated top and bottom plates, a narrow end wall and an open wide end for the intake of air to be filtered. A pair of enclosure plates are pivotally mounted to the side panels in a parallel relationship to the respective top and bottom plates to form a pair of rectangular enclosures for respectively supporting electrostatic filter pads. The enclosure plates pivot open for removal and replacement of the filter pads. The side panels, top and bottom plates and rear wall are made from sheet metal blanks using cutting, bending and stamping processes. The enclosure plates are made from sheet metal blanks or welded wire structures. The advantage is that the structures are manufactured using simple automated processes and are quickly assembled without sub-assembly, thus time and labour are saved and costs are reduced.

27 Claims, 12 Drawing Sheets

STRUCTURES FOR ELECTROSTATIC V-BANK AIR FILTERS

TECHNICAL FIELD

The present invention relates to air filters, and more particularly, to a structure useful for constructing electrostatic V-bank air filters.

BACKGROUND OF THE INVENTION

Public awareness of environmental issues has steadily increased over the past few decades. As a result, the general public now demands a quality environment with clean air in which to live, work and entertain. Various types of air filtering systems are used in residential and commercial buildings to improve the quality of the air. One commonly used type of air filter system is the "bag" or "pocket" filter designed to significantly increase filtering surface areas in an air flow passage. Another type designed for the same purpose is the V-bank filter which doubles the filtering surface area, compared to a planar filter in the same air flow passage.

A known pocket filter uses multiple filter bags arranged in housing of a suitable shape. The manufacture of such bag filters is expensive because the disposable filter bags have to be interconnected using a sewing or gluing process.

Pocket air filters are assembled in several ways. For example, they may be constructed of folded wire grids which are secured between end walls to receive filter material consisting of a glass wool, cotton wool or textile cloth supported by resilient removable frames. An example of a pocket filter structures is taught in U.S. Pat. No. 3,691,736, entitled POCKET FILTER FOR AIR AND GAS PURIFICATION which issued to Neumann on Sep. 19, 1972.

Passive bag, pocket and V-bank filters are, however, not particularly efficient for removing small particulates suspended in air. This is especially true in environments contaminated with heavy smoke, such as casinos and bars, or industrial facilities used for welding, etc. In such environments, it has been demonstrated that high performance electrostatic air filters are superior to passive bag or V-bank filters for removing impurities from the air.

Electrostatic air filters generally include a disposable filter cartridge of a charged media type and a filter cartridge holder which is provided with a high voltage power supply for charging the filter. Electrostatic air filters of the charged media type are well known and taught in U.S. Pat. No. 4,886,526 entitled ELECTRONIC AIR FILTRATION SYSTEM, which issued to Joannou on Dec. 12, 1989. Joannou teaches a disposable filter cartridge which is supported by a support frame constructed to facilitate servicing the filter without having to handle individual filter pads. The disposable filter cartridge consists of an inner screen of conductive material which is sandwiched between a pair of dielectric, fibrous pads. This inner screen is connected via an electrode to one side of a high voltage power supply to electrostatically charge the filter cartridge. An outer surface of the fibrous filter pads are in turn covered by a pair of conductive screens which are connected to the other side of the power supply. These outer screens may be a part of the disposable filter cartridge or a part of the support frame, but both embodiments function in the same way.

Electrostatic V-bank air filters are constructed from a pair of electrostatic air filters supported by V-shaped side panels which are installed in an air bonding system. The pair of filters share the air cleaning load of air drawn through an air intake end at a wide end of the V-shaped side panels.

Because of their air cleaning efficiency and ease of maintenance, there is a rapidly increasing demand for electrostatic V-bank air filters. They have become particularly popular in public places with significant air quality problems, such as casinos and bars where cigarette smoke is a particular concern. They are also gaining acceptance in animal husbandry where they are used for odour and disease control in cattle and hog barns, and poultry houses. They are also expected to rapidly gain acceptance in office and commercial buildings where they contribute to air quality.

The Applicant manufactures and sells electrostatic V-bank air filters in which each V-bank unit includes two substantially triangular side panels with rectangular top and bottom electrostatic filter units transversely secured to side edges of the respective side panels. The filter units are constructed of extruded metal and plastic frame elements, such as disclosed in the Applicant's U.S. Pat. No. 5,059,218, entitled CONSTRUCTION FOR SUPPORTING A FLEXIBLE SHEET which issued to William E. Pick on Oct. 22, 1991. While these V-bank filters perform well, sub-assembly of each filter unit is required before assembly of the V-bank unit. This is a time consuming and labour intensive process.

Consequently, there is a need for a structure for electrostatic V-bank air filters which facilitates manufacture and assembly of V-bank air filters to reduce manufacturing costs and decrease assembly time.

SUMMARY OF THE INVENTION

An object of the invention is to provide a simple structure for electrostatic V-bank air filters.

Another object of the invention is to provide a structure for an electrostatic air filter, which may be manufactured using simple mechanical processes and rapidly assembled from a few simple parts.

A further object of the invention is to provide a structure for electrostatic air filter which is assembled from components manufactured substantially entirely from sheet metal blanks using automated sheet metal cutting, bending and stamping processes.

In accordance with one aspect of the invention there is provided a structure for an electrostatic V-bank air filter, comprising a pair of substantially triangular side panels, a perforated electrically conductive top plate and a perforated electrically conductive bottom plate; either ones of side panels and the top and bottom plates having respective angled side edges adapted to mount the top and bottom plates transversely to the side panels to form a substantially V-shaped housing; a pair of electrically conductive enclosure plates for respectively forming a rectangular enclosure in combination with a one of the top plate and the bottom plate, the enclosure plates respectively supporting an electrostatic filter pad when the enclosure plates are in a closed position, each enclosure plate being movable to an open position in which the electrostatic filter pad can be removed for replacement; locking mechanisms respectively adapted to detachably secure the pair of enclosure plates in the closed position and electrodes adapted to deliver an electric charge to the respective electrostatic filter pads when the enclosure plates are in the closed position.

Preferably, each side panel has a truncated triangular shape and is constructed from a sheet metal blank with side edges and rear edges bent at a right angle with respect to one of the inner side and outer side walls. A front edge is bent outwardly to form a mounting flange for the filter unit. Each of the top and bottom plates is rectangular and constructed from a sheet metal blank with a front edge bent outwardly to form the flange and a rear edge bent inwardly to support a rear wall. The top and bottom plates are respectively mounted transversely to the side edges of the side panels. The rear wall, which is also constructed from a sheet metal blank, is mounted to the rear edges of the side panels. The top and bottom plates and the rear wall form the V-shaped housing. The respective front edges of the side panels and top and bottom plates form a mounting flange surrounding the open end of the housing.

Each enclosure plate is also preferably rectangular and constructed from a sheet metal blank or a welded wire structure. If constructed from a sheet metal blank, side edges and a rear edge are bent at a right angle with respect to either surface thereof and a front edge bent at a right angle with respect to an opposite surface thereof. If constructed from a welded wire structure, the rear end includes an integral welded wire hinge pin which extends beyond the opposite side edges and the front end is bent downwardly at a right angle with respect to a bottom surface thereof.

In accordance with one embodiment of the invention, each enclosure plate is pivotally mounted to a rear end of the side panels adjacent the end wall so that each enclosure plate is independently pivotable from the closed position to the open position.

In accordance with another embodiment of the invention, the V-shaped housing is reversely positioned so that the end wall is at the front and the open end is placed at the rear. Each enclosure plate is pivotally mounted to the side edges of the respective side panels adjacent the open end of the V-shaped housing. The side edges of the side panels extend out from the respective top and bottom plates so that the enclosure plates are independently pivotable at the outside of the V-shaped housing from the closed position to the open position.

The advantage of the structure in accordance with the invention is that all major parts of the structure are manufactured from sheet metal blanks or welded wire structures using cutting, bending and stamping processes which are readily automated. Furthermore, the structure is assembled in a simple manner and no sub-assembly is required.

BRIEF DESCRIPTION OF THE DRAWINGS

The invention will now be further explained by way of example only and with reference to the following drawings, wherein:

FIG. 3b is a perspective view of one of the side panels formed from the sheet metal blank shown in FIG. 3a;

DETAILED DESCRIPTION OF THE PREFERRED EMBODIMENT

Figure 1:
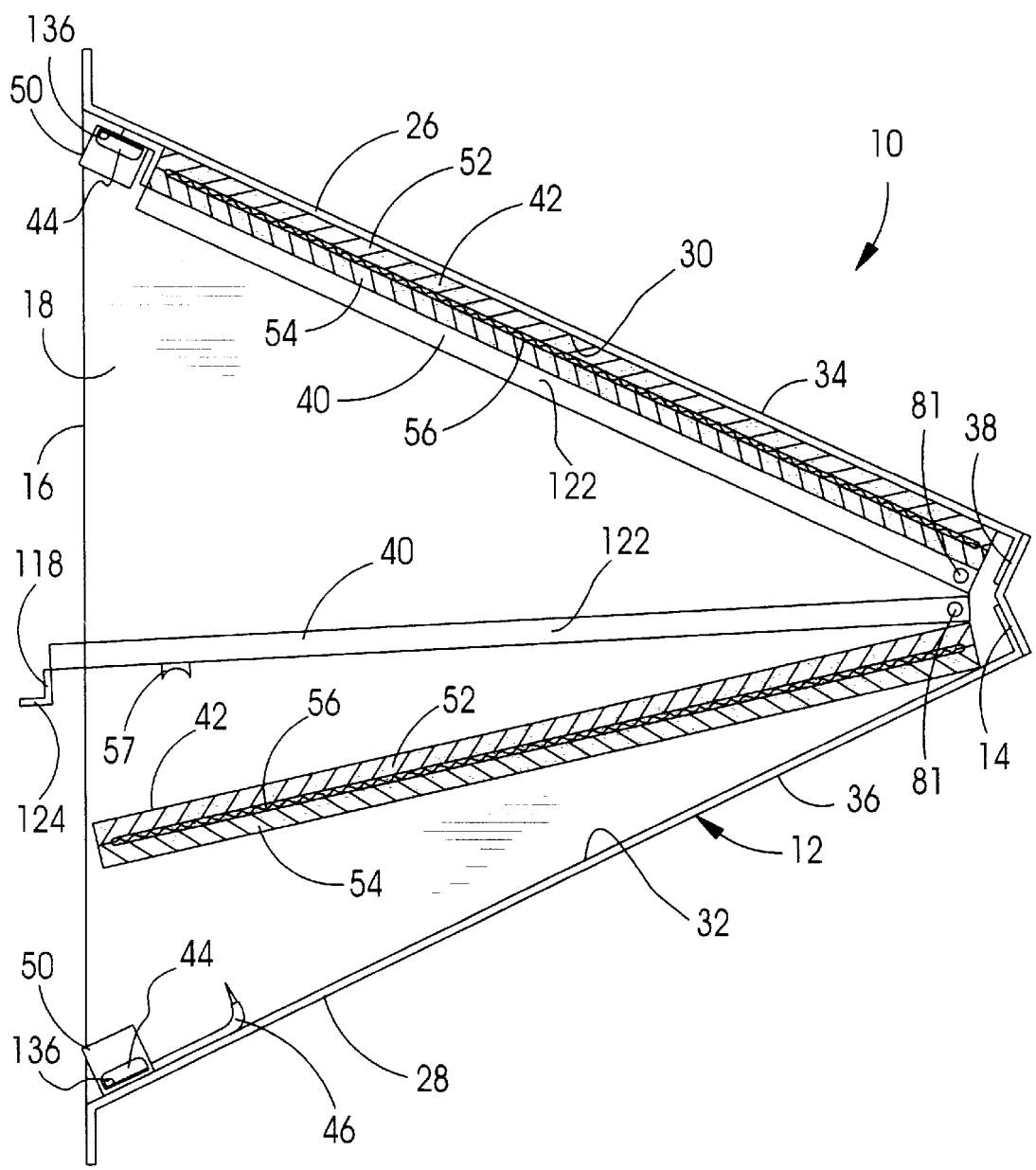
FIG. 1 is a side view of a preferred embodiment of an electrostatic air filter in accordance with the invention, one of the side panels being removed to show the internal structure of the air filter.
Figure 2:
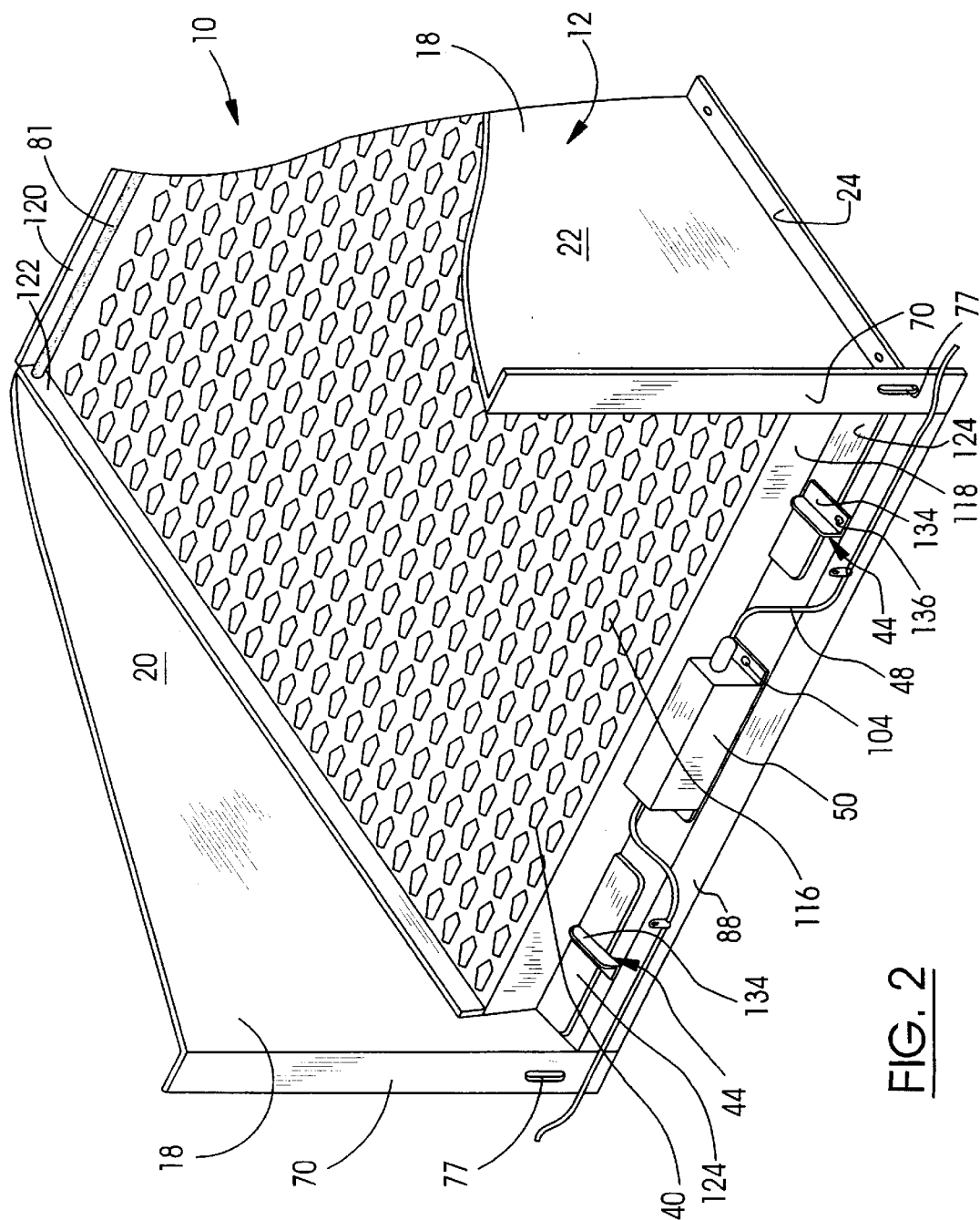
FIG. 2 is a partial perspective view of the air filter shown in FIG. 1, illustrating the details of the front end of the air filter.

FIGS. 1 and 2 show a structure 10 for an electrostatic V-bank air filter in accordance with a preferred embodiment of the invention. The structure 10 includes a substantially V-shaped housing 12 having a closed narrow end 14 and an open wide end 16. The housing 12 includes a pair of substantially triangular side panels 18, each having an inner side 20 (FIG. 2) and side edges 24 (FIG. 2) disposed at a right angle with respect to the outer side. The side edges may be disposed at a right angle with respect to either one of the inner side 20 and outer side 22. A perforated electrically conductive top plate 26 and a perforated electrically conductive bottom plate 28 respectively have an inner surface 30, 32 and an outer surface 34, 36. The top plate 26 and the bottom plate 28 are respectively mounted transversely to the side edges 24 of the side panels 18 to form the housing.

The substantially triangular side panels 18 are truncated at the narrow end 14 and a rear wall 38 is mounted to the respective edges of the truncated ends of the side panels 18 to form the closed narrow end 14.

A pair of perforated electrically conductive enclosure plates 40 pivotally mounted to the side panels 18 in parallel relationship with the top plates 26 and bottom plates 28 form a pair of rectangular enclosures for respectively supporting an electrostatic filter pad 42 when the enclosure plates 40 are in a closed position. An upper enclosure plate 40 is illustrated in the closed position in FIG. 1 and a lower enclosure plate 40 is illustrated in the closed position in FIG. 2. Each enclosure plate 40 is enabled to pivot independently to an open position in which the electrostatic filter pad 42 can be removed for replacement. The lower enclosure plate 40 is illustrated in the open position in FIG. 1. The respective enclosure plates 40 are detachably locked in the closed position by locking mechanisms 44 which will be described below in detail. An electrode 46 is mounted to each of the top and bottom plates 26, 28 at the open end 16 to deliver an electric charge to an electrostatic charging medium 56 in the electrostatic filter pad 42 in a manner well known in the art. The position of the electrodes 46 is a matter of design choice. A housing 50 houses a high voltage power supply (not illustrated) that generates a high voltage, low amperage output current, in a manner well known in the art. Power is supplied to the high voltage power supply by a low voltage power supply cord 48, the ground conductor (not illustrated) of the power supply cord 48 being in electrical connection with the respective electrically conductive top and bottom plates 26, 28. Each of the electrodes 46 is preferably and conveniently L-shaped and attached to but insulated from the housing 50, the insulation covering all but a tip of the electrode which contacts the charging medium 56 when the electrostatic air filter pad is inserted in the enclosure.

The electrostatic air filter pad 42 includes fibrous filter pads 52 and 54 which surround the charging medium 56. The charging medium 56 may be a metallic screen, an expanded metallic mesh or an electrically conductive odor absorbing foam as described in Applicant's U.S. Pat. No. 5,108,470 which issued on Apr. 28, 1992, or other conductive materials. To prepare the V-bank filter for use, the two respective electrostatic air filter pads 42 are placed into the structure 10. One of the air filter pads 42 is inserted between the lower enclosure plate 40 and the bottom plate 28, and a front edge of the lower enclosure plate 40 is lowered and secured in the closed position using the locking mechanism 44. Lowering the enclosure plate 40 forces the electrode 46 upwardly through the fibrous filter pad 54 and into contact with the charging medium 56 to deliver electrostatic charge thereto. To ensure that the electrode 46 does not contact the electrically conductive lower enclosure plate 40, an insulator 57 is attached to a bottom surface thereof in alignment with the tip of electrode 46. The insulator 57 also inhibits electrical arching between the electrode 46 and the grounded enclosure plate 40. The filter pad 42 is inserted into place between the upper enclosure plate 40 and the top plate 26 in a similar manner.

Figure 3A:
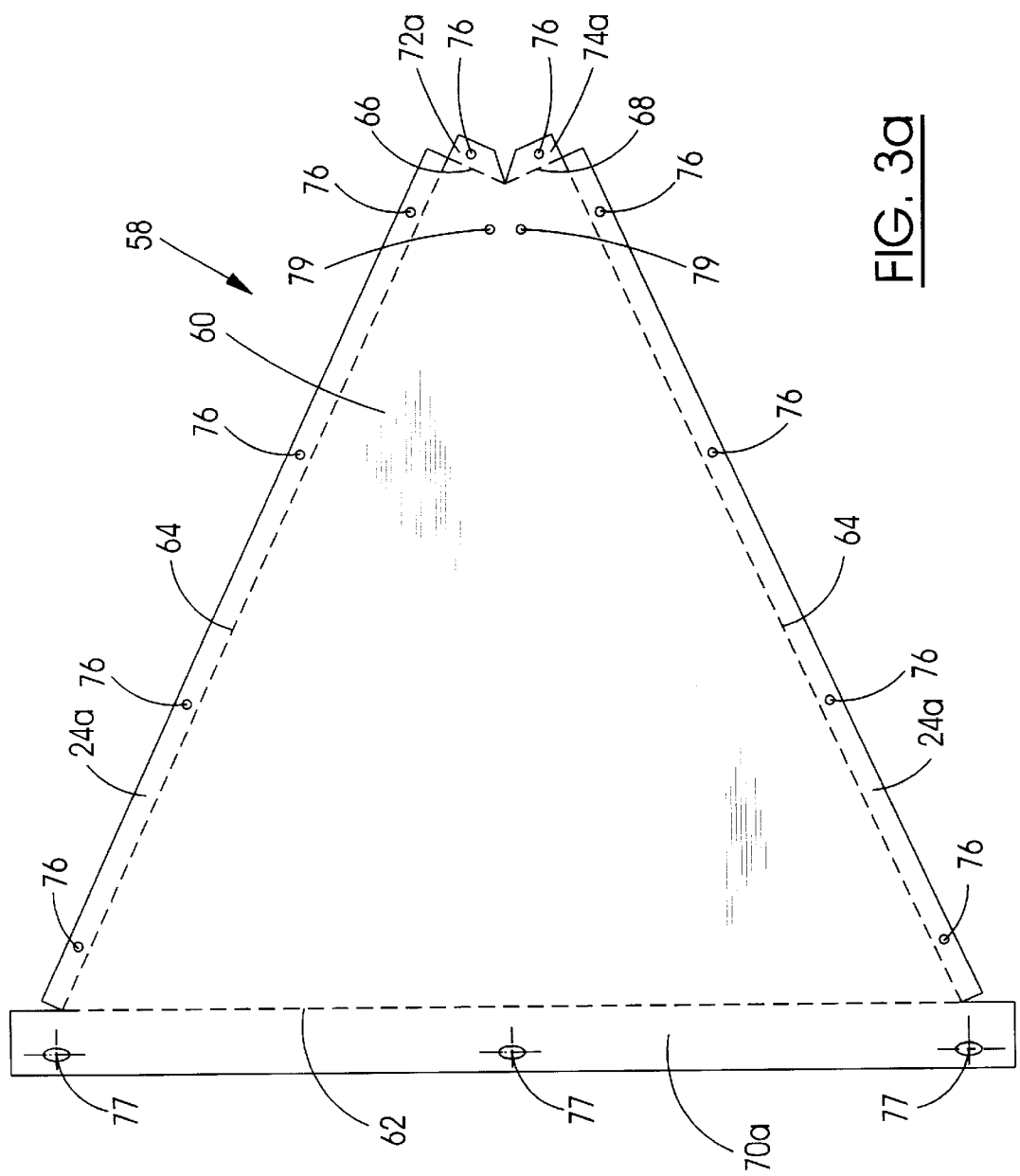
FIG. 3a is a plan view of a sheet metal blank which is to be used to form side panels of the air filter shown in FIG. 1.

The panels and plates of the structure 10 are preferably and economically constructed from a sheet metal stock such as a galvanized steel sheet. For greater endurance in damp, corrosive environments, stainless steel or electrically conductive plastics may also be used. Each of the side panels 18, as illustrated in FIG. 3a, is made from a substantially triangular sheet metal blank 58. The sheet metal blank 58 includes a truncated triangular portion 60 defined by a front end line 62, two side lines 64 and two rear end lines 66, 68. The sheet metal blank 58 further includes peripheral edge portions 70a, 24a, 72a and 74a that respectively extend along the front end line 62, side lines 64 and rear end lines 66, 68. Assembly bores 76 pierce the respective peripheral edge portions 24a, 72a and 74a. Slots 77 are provided in the peripheral edge portion 70a for adjustably mounting the structure 10 to an air handling system (not illustrated). A pair of bores 79 pierce the truncated end of the sheet metal blank 58 near the rear end lines 66, 68. The bores 79 respectively receive hinge pins 81, as shown in FIG. 1. After the sheet metal blank 58 is cut to the shape shown in FIG. 3a, the edge portions are bent, as described above, using metal bending techniques, well known in the art. Following the bending process, the peripheral edge portions 70a, 24a, 72a and 74a form the respective front edge 70, side edges 24 and the rear edges 72, 74.

Figure 4A:
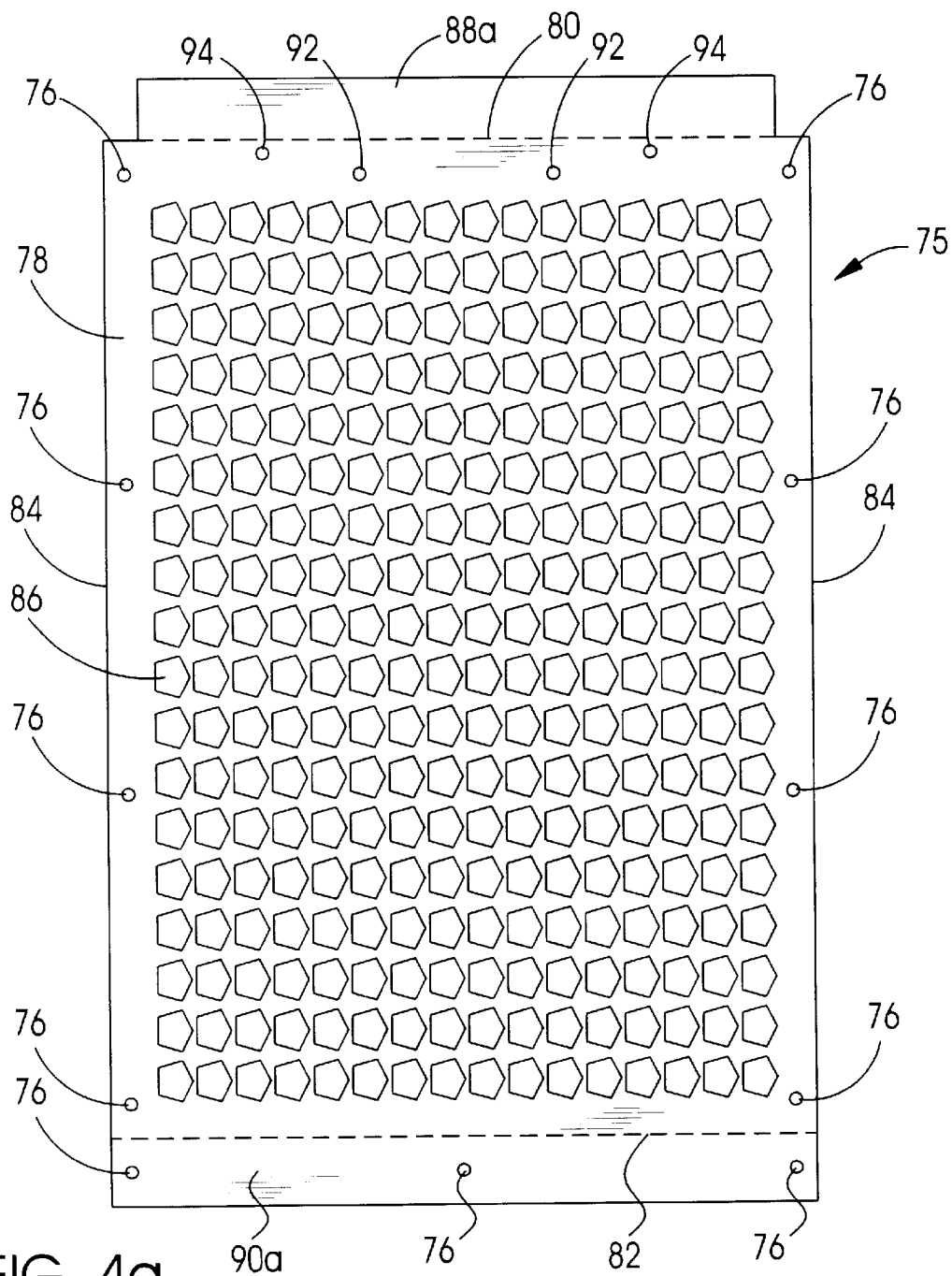
FIG. 4a is a plan view of a sheet metal blank which is used to form a top or bottom plate of the air filter shown in FIG. 1.

The top and bottom plates 26, 28 are formed from a single sheet metal blank 75, as illustrated in FIG. 4a. The sheet metal blank 75 includes rectangular central portion 78 which is defined by a front bend line 80, rear bend line 82 and side edges 84. The sheet metal blank 76 is perforated with apertures 86 to permit air flow therethrough. The apparatus 86 are preferably formed using a metal stamping process. The sheet metal blank 75 further includes a front edge portion 88a and a rear edge portion 90a extending along the respective front bend line 80 and rear bend line 82. The front edge portion 88a is cut off at each end by a length equal to a width of the side edges 84. A plurality of assembly bores 76 pierce the rear edge portion 90a and the central portion 78 adjacent the respective side edges 84. The number and position of the assembly bores 76 adjacent the respective side edges 84 correspond to the bores 76 in the peripheral edge portions 24a of the sheet metal blank 58 (FIG. 3a). A pair of bores 92 pierce the rectangular central portion 78 near the front bend line 80 for mounting the housing 50 for the high voltage power supply. Another pair of bores 94 also pierce the rectangular central portion 78 closer to the front bend line 80. The bores 94 are for mounting the locking mechanism 44, which is described below. The length of the rectangular central portion 78 from the front bend line 80 to the rear bend line 82 is equal to a length of the side edge 24 of the side panel 18.

Figure 4B:
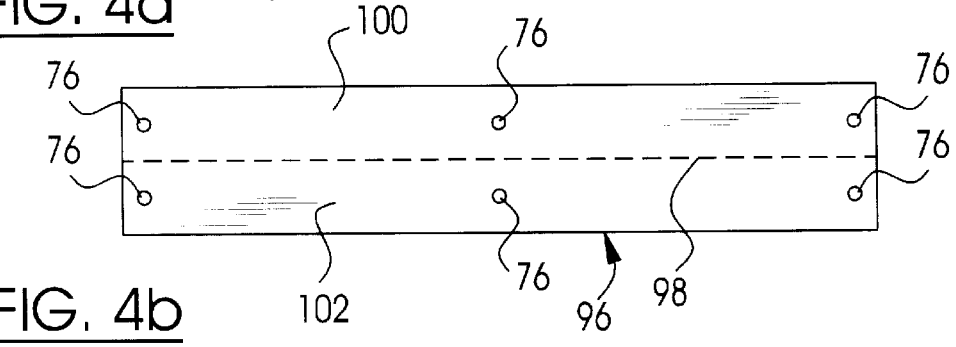
FIG. 4b is a plan view of a sheet metal blank which is used to form an end wall of the air filter shown in FIG. 1.

FIG. 4b illustrates a rectangular sheet metal blank 96 for forming the narrow end 14 of the structure 10 shown in FIG. 1, the sheet metal blank 96 is divided by a longitudinal bend line 98 into an upper portion 100 and a lower portion 102. A length of the sheet metal blank 96 is equal to a width of the sheet metal blank 75 described above with reference to FIG. 4a. Assembly bores pierce each of the upper and lower portions 100, 102. The number and position of the assembly bores 76 in each upper and lower portion correspond to the number and position of the assembly bores 76 in the rear edge portion 90a of the sheet metal blank 75 (FIG. 4a).

The rear edge portion 90a of the sheet metal blank 75 is bent along the rear bend line 82 at a right angle with respect to either surface of the sheet metal lank 75 and the front edge portion 88a is bent along the front bend line 80 at angle α (FIG. 4c) with respect to the opposite surface of the sheet metal blank 75 to form the top and bottom plates 26, 28 with respective front edges 88 and rear edges 90. The angle α is a supplementary angle of angle β, and angle β is less than 90°. The rectangular sheet metal blank 96 (FIG. 4b) is bent along the longitudinal center line 98 at an angle that is equal to 2β to form the end wall 38.

Figure 4C:
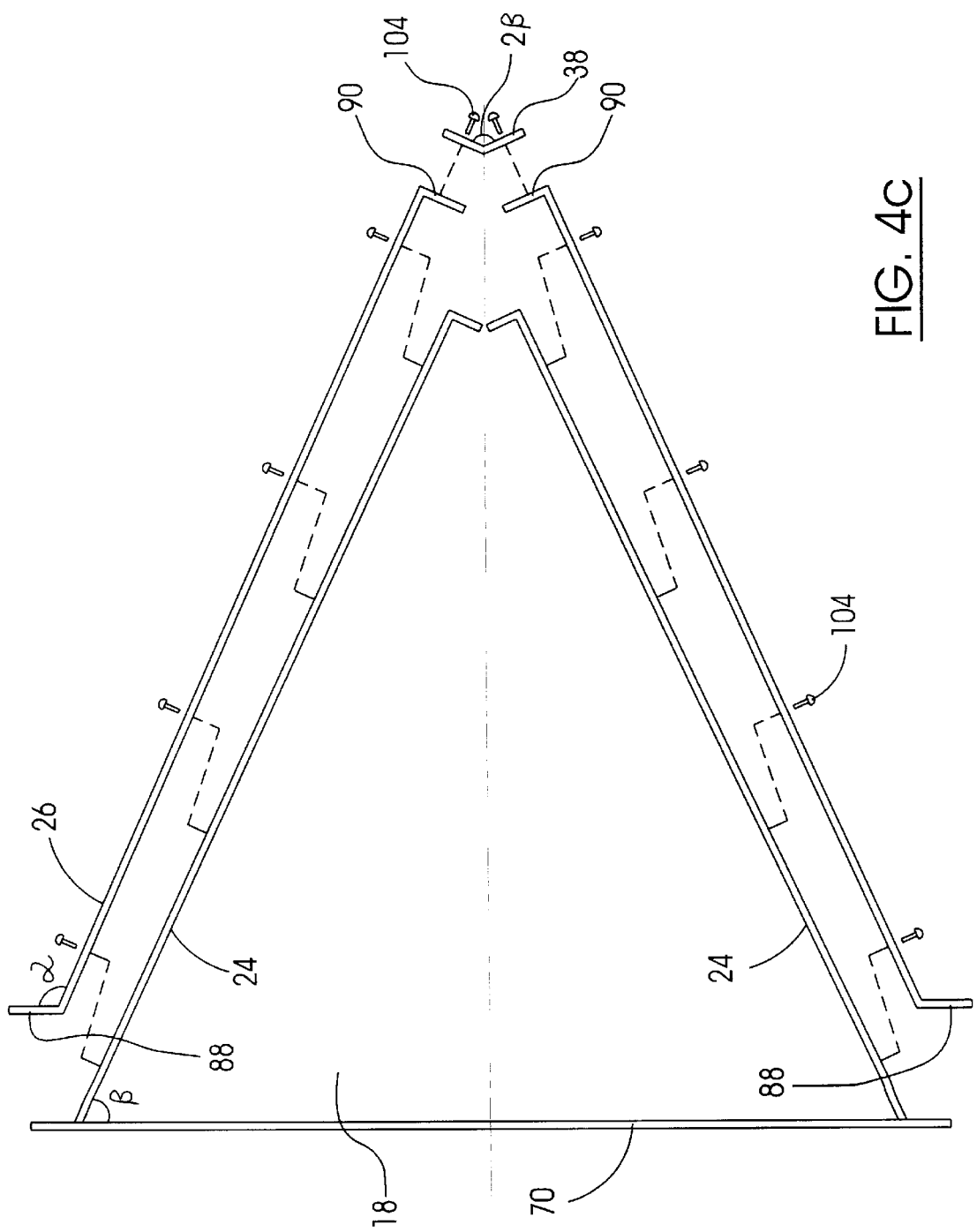
FIG. 4c is an exploded side view of a housing of the air filter shown in FIG. 1, showing a method of assembling the frame of the air filter.

To assemble the housing 12, the assembly bores 76 in the side edge 84 of a top plate 26 are aligned with respective assembly bores 76 in the side edges 24 of a side panel 18 and rivets, sheet metal screws or equivalent fasteners, are inserted to secure the top plate 26 to the side edge 24 of the side panel 18. In a similar manner, a bottom plate 28 is mounted to the opposite side edge 24 of the side panel 18, as illustrated in FIG. 4c. The opposite side panel 18 is then connected to the top and bottom plates in the same way using fasteners 104. The rear wall 38 is positioned on the rear end of the top and bottom plates 26, 28. The corresponding assembly bores 76 are aligned to receive the fasteners 104 to secure the rear wall 38 to the side panels 18 and the top and bottom plates 26, 28 to form the closed end 14 of the housing 12. When the structure 10 is assembled, the front edges 88 of the top and bottom plates 26, 28 extend in a vertical plane defined by the front edges 70 of the side panels 18 to from a mounting flange surrounding the open end 16 of the housing 12.

Figure 5:
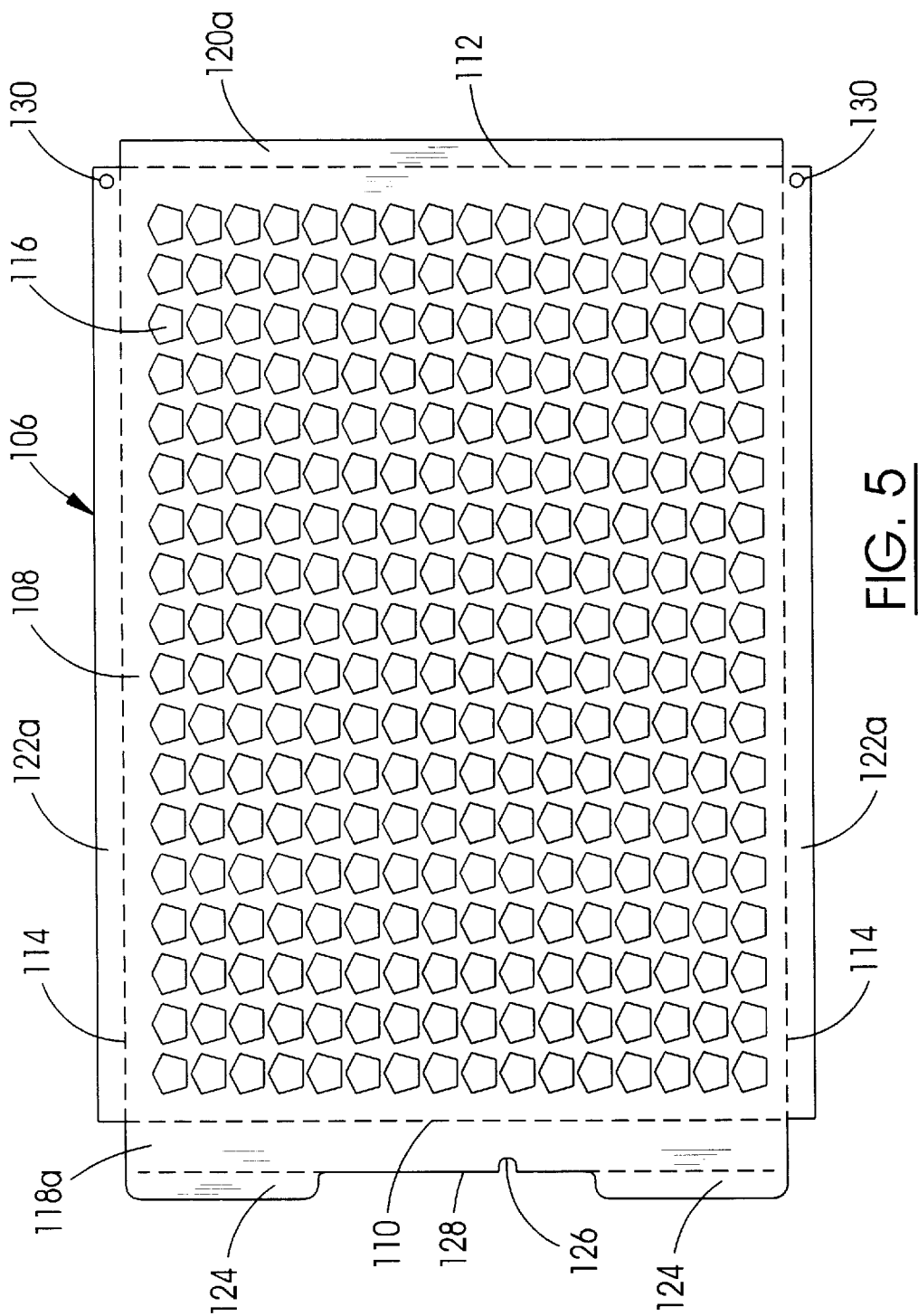
FIG. 5 is a plan view of a sheet metal blank which is used to form the enclosure plates of the air filter shown in FIG. 1.

FIG. 5 illustrates the enclosure plate 40 which is also preferably made from a rectangular sheet metal blank 106. The rectangular sheet metal blank 106 includes a rectangular central portion 108 defined by a front bend line 110, a rear bend line 112 and two side bend lines 114. The sheet metal blank 106 is likewise perforated with apertures 116 to permit air to flow therethrough. The sheet metal blank 106 further includes peripheral edge portions 118a, 120a and 122a that extend along the respective front bend line 110, rear bend line 112, and the side bend lines 114. The peripheral edge portion 118a is wider than the other edge portions and has a pair of spaced apart lip portions 124 adjacent the respective ends thereof. A central recessed edge 128 extends between the two lip portions 124 and a notch 126 is cut in the recessed edge 128. A pair of bores 130 pierce a rear corner of the peripheral edge portion 122a. When the sheet metal blank 106 is used to form the enclosure plate 40, the peripheral edge portions 120a and 122a are bent along the bend lines 112, 114 at a right angle with respect to either surface of the rectangular central portion 108 and the lip portions 124 are bent along an extension of the recessed edge 128 at a right angle with respect to the same surface of the rectangular central portion 108. The peripheral edge portion 118a is bent along the front bend line 110 at a right angle with respect to the opposite surface of the sheet metal blank 106 so that the peripheral edge portions 118a, 120a, 122a form the respective right angled front edge 118, rear edge 120 and side edges 122 of the enclosure plate 40 as illustrated in FIGS. 1 and 2. To mount the enclosure plates to the side panels 18, the bores 130 through the respective peripheral edge portions 122a are aligned with the respective bores 79 through the side panels 18 and the hinge pin 81 (FIG. 2) is inserted through the bores 130 and the corresponding bores 79 in the respective side panels to form the hinge, permitting pivotal movement of the enclosure plates 40.

The notch 126 on the recessed edge 128 of the edge portion 118a is formed to accommodate the electrode 46 which extends from the high voltage power supply housing 50 (FIG. 1) under recessed edge 128 of the enclosure plate 40. The insulator 57 is fastened to an inner surface of the upper or lower enclosure plates 40 in alignment with the point of the electrode 46 when the enclosure plate 40 is in the closed position.

The lip portions 124 (FIG. 5) of the enclosure plate 40 are in a parallel relationship with the top and bottom surfaces of the enclosure plates 40 and, therefore, abut an inner surface of the respective top and bottom plates 26, 28 when the enclosure plates 40 are in the closed position. A pair of toggles 134 (FIG. 2) 15 are pivotally mounted to an inner surface of the top and bottom plates 26, 28 using fasteners 136 which are respectively received in the bores 94, as shown in FIG. 4a. The toggles 134 pivot over the respective lip portions 124 to provide the locking mechanisms 44.

Figure 3B:
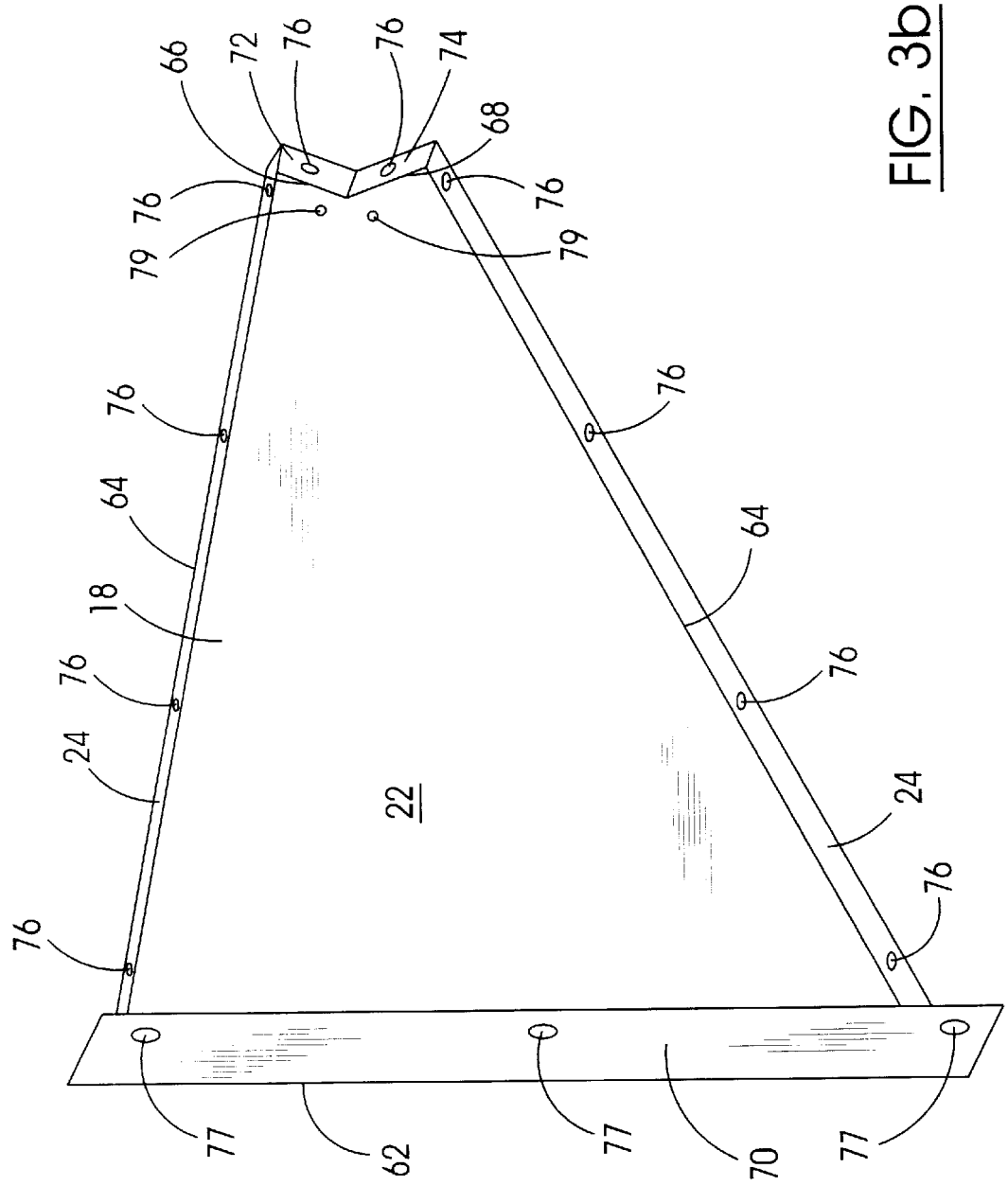
Figure 6:
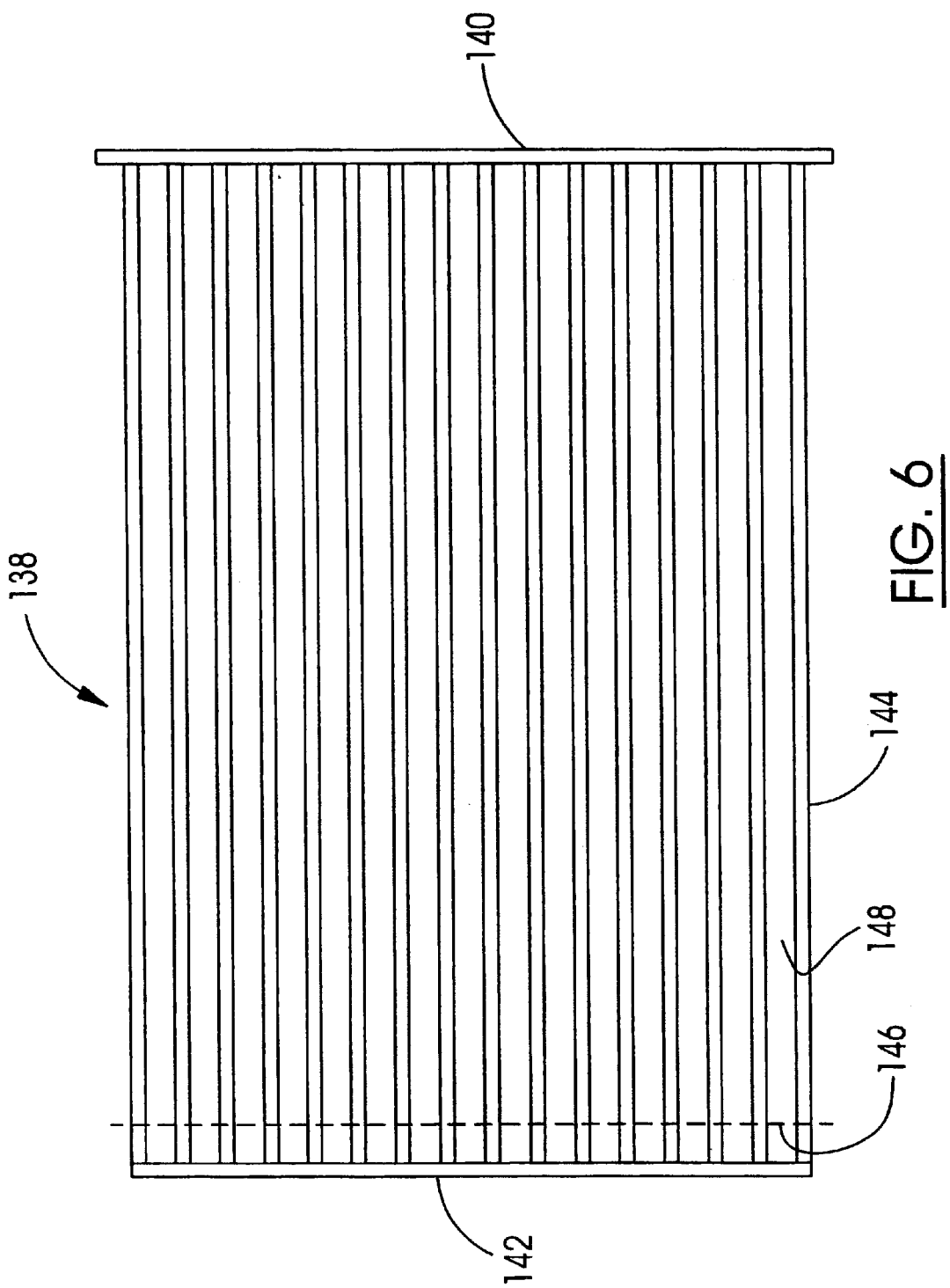
FIG. 6 is a plan view of a welded wire structure used to form the enclosure plates of the air filter shown in FIG. 1.

FIG. 6 shows an alternate embodiment of an enclosure plate in which a welded wire structure 138 replaces the sheet metal structure shown in FIG. 5. The welded wire structure 138 has the advantages of being inexpensive to manufacture, requires minimal bending and pre-assembly preparation and provides excellent air flow properties while being extremely rigid and durable. The welded wire structure 138 includes a wire rear edge 140, a wire front edge 142 and a plurality of spaced-apart parallel wires 144 that are separated by a gap 148 and respectively welded to the wire front and rear edges using methods well known in the art. The rear edge 140 is a stiff wire which extends beyond side edges of the welded wire structure 138 to provide a hinge pin that is inserted through bores 79 in side panels 20, 22 (FIG. 3) to pivotally support the enclosure plate as described above. The front edge 142 is bent downwardly at a right angle along a bend line 146 to form the enclosure plate shown in FIG. 7.

Figure 7:
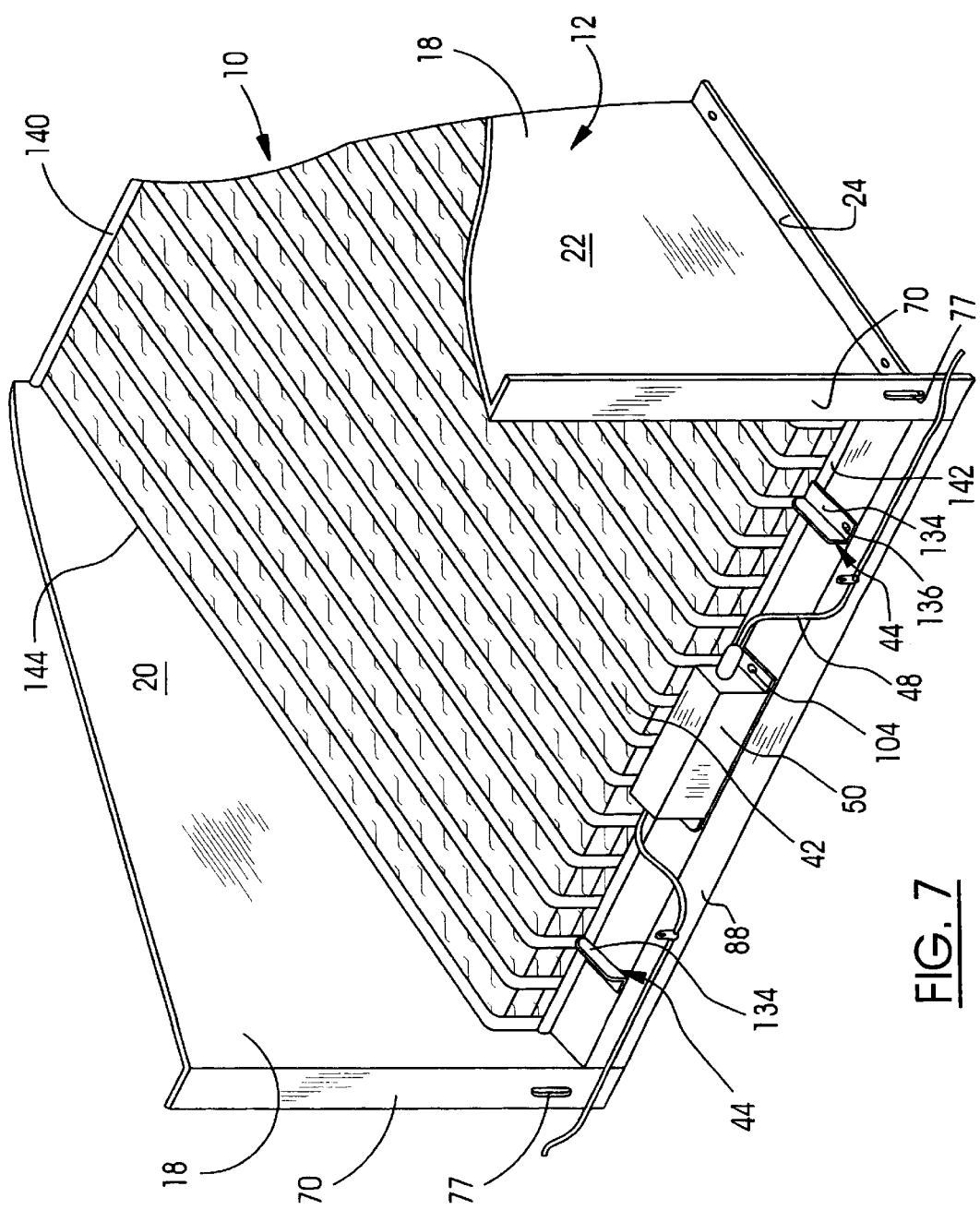
FIG. 7 is a partial perspective view of the air filter shown in FIG. 1 when the welded wire structure shown in FIG. 6 is used for the enclosure plates.

FIG. 7 is a partial perspective view of the structure 10 for an electrostatic V-bank air filter with a welded wire enclosure plate shown in FIG. 6. As is apparent, the enclosure plate is substantially identical to the one described above with reference to FIG. 5. The wire front edge 142 is held in the closed position by the pair of toggles 134, as described above with respect to an enclosure plate 106 made of sheet metal. An advantage of the welded wire structure 138 is that it is inexpensive to manufacture and requires minimal pre-assembly shaping. The welded wire structure also has good air permeability since each welded wire runs parallel to an air flow drawn through the V-bank air filter 10. The welded wire structure 138 therefore provides very little resistance to air flowing through the air filter.

Figure 8:
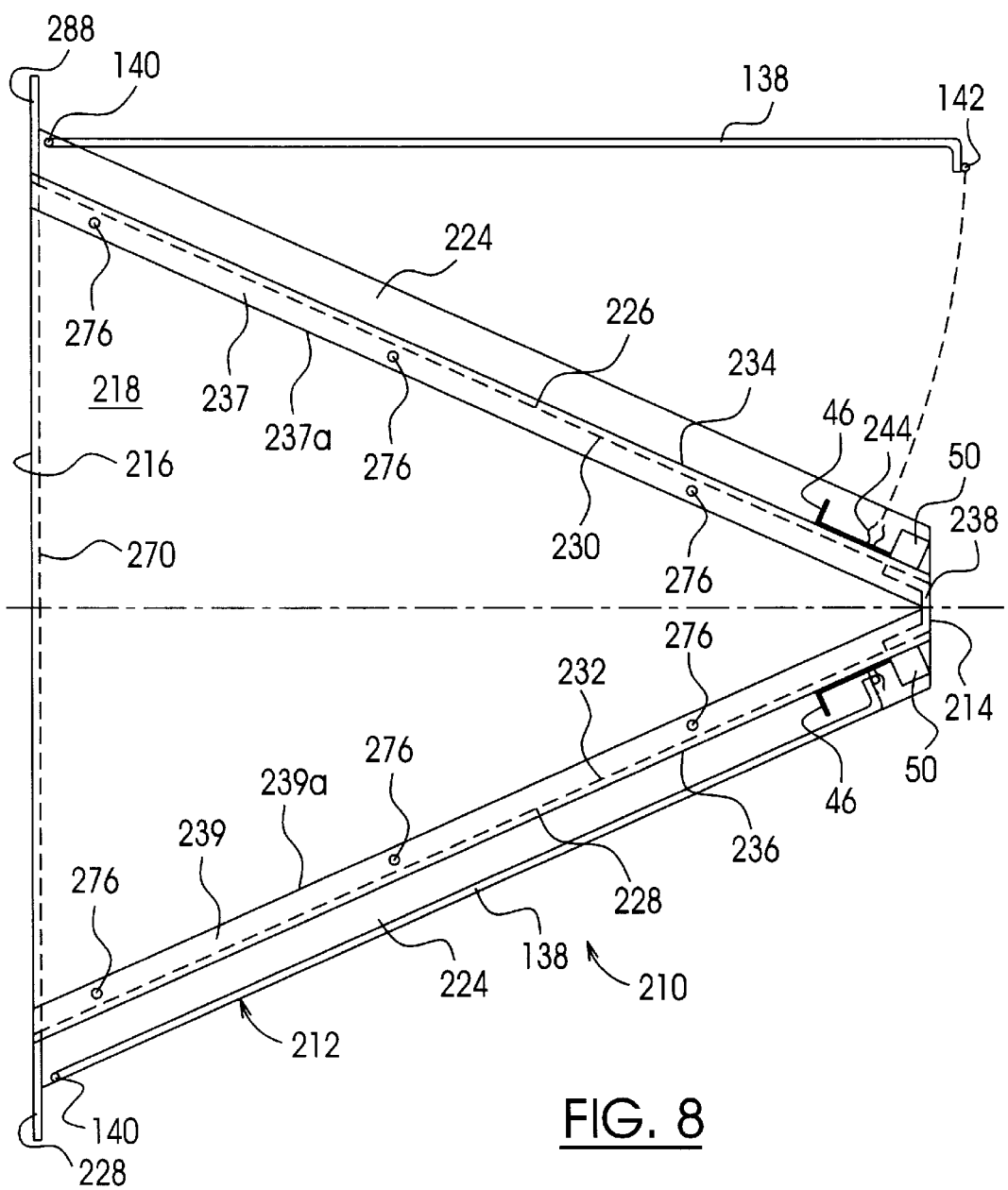
FIG. 8 is a side view of another preferred embodiment of an electrostatic air filter in accordance with the invention, one of the side panels and filter pads being removed to show the internal structure of the air filter.

FIG. 8 illustrates a structure 210 for an electrostatic V-bank air filter in accordance with another preferred embodiment of the invention. This structure provides a reverse V-bank air filter for use in air handling equipment with inadequate space behind the filter support structure to accommodate the regular V-bank air filter shown in FIGS. 1–7. Similarly to the structure 10 shown in FIG. 1, the structure 210 includes a substantially V-shaped housing 212 having a closed narrow end 214 and an open wide end 216. The housing 212 includes a pair of substantially triangular side panels 218, one of the side panels 218 at the front is removed to show the internal structure of the air filter. Each side panel 218 has a flat side edge 224 and a wide end edge 270 bent outwardly at a right angle, which is more clearly shown in FIG. 9 which illustrates a sheet metal blank 218a used to form the side panels 218, as described below in more detail. A perforated electrically conductive top plate 226 and a perforated electrically conductive bottom plate 228 respectively have an inner surface 230, 232 and an outer surface 234, 236. The top plate 226 and bottom plate 228 have respective side edges 237, 237a, 239 and 239a that are bent downwardly at a right angle with respect to the inner surfaces 230, 232, as is more clearly shown in FIG. 10 which illustrates the top plate 226. The top plate 226 and bottom plate 228 are respectively mounted transversely to the side panels 218 to form the housing, using rivets or bolts (not shown), inserted through the bores 276 in the side panels 218 and the side edges 237, 237a, 239 and 239a of the top and bottom plates 226, 228. The respective outer surfaces 234, 236 of the top and bottom plates 226, 228 align with respective dashed lines 234a and 236a shown on the side panels 218 (FIG. 9) when the top plate 226 and bottom plate 228 are mounted to the side panels 218. Consequently, the edges 224 of the side panels 218 respectively extend the outer surfaces of top plate 226 and bottom plate 228.

Figure 9:
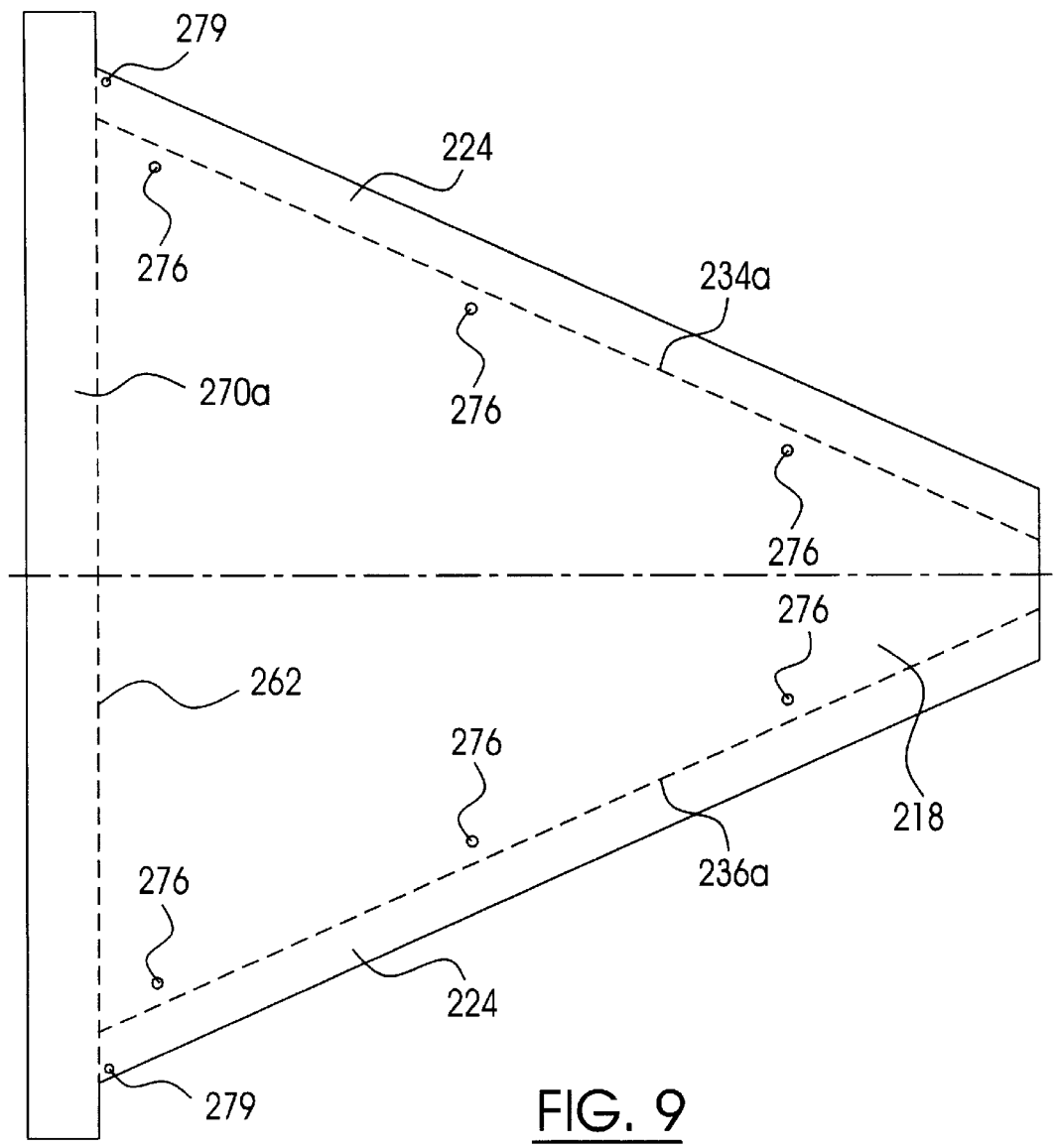
FIG. 9 is a plan view of a sheet metal blank which is to be used to form side panels of the air filter shown in FIG. 8.

The substantially triangular side panels 218 are truncated at the narrow end 214 and a front wall 238 is mounted to the respective top and bottom plates 226, 228 at the truncated ends of the side panels 218 to form the closed narrow end 214 (FIG. 9).

A pair of enclosure plates 138 (FIG. 8), preferably a welded wire structure identical to the structure shown in FIG. 6, are pivotally mounted to pivot bores 279 (FIG. 9) in the side panels 218 by the wire rear edge 140 which forms a hinge pin. The enclosure plates 138 are mounted in parallel relationship with the top plate 226 and bottom plate 228 to form a pair of rectangular enclosures for respectively supporting an electrostatic filter pad (not shown). The lower enclosure plate 138 is illustrated in the closed position and the upper enclosure plate 138 is illustrated in an open position for replacement of the electrostatic filter pad. The enclosure plates 138 may also be made from sheet metal blanks 106 using the pattern shown in FIG. 5, the side edges 122a being preferably bent downwardly with respect to an outer surface of the respective enclosure plates.

The electrode 46 and the housing 50 that houses a high voltage power supply are identical to those illustrated in FIGS. 1 and 2, and indicated by the same reference numerals. However, the electrodes 46 and the housings 50 are mounted at the closed narrow end 214 to the outer surfaces 234, 236 of the respective top and bottom plates 226, 228.

At least one, preferably two clips 244 are mounted to each of the top and bottom plates 226, 228 to detachably secure the wire font edge 142 of the enclosure plates 138 in the closed position (see lower enclosure plate 138 shown in FIG. 8). Alternatively, toggles 134 (FIG. 7) can also be used to secure the upper and lower enclosure plates in the closed position. The sheet metal blank 218a (FIG. 9) includes a front edge 270a. The edge 270a is bent along dashed line 262 to form a flange 270 along the side panels for mounting the reverse V-bank air filter to air handling equipment.

Figure 10:
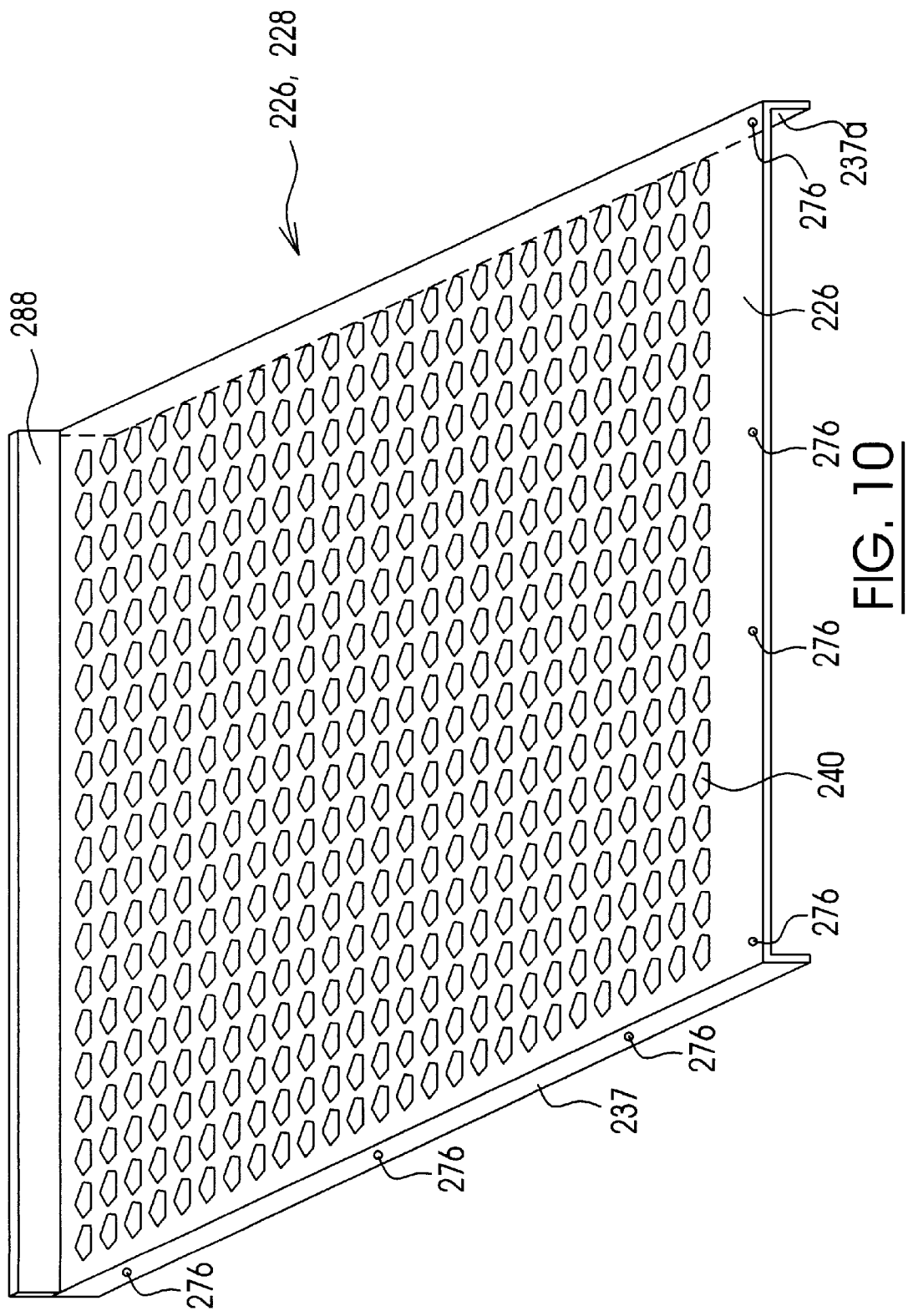
FIG. 10 is a perspective view of a top or bottom plate of the air filter shown in FIG. 8.

The perforated top plate 226 shown in FIG. 10 is made from a sheet metal blank similar to that shown in FIG. 4a, having openings 240 to permit the passage of air therethrough. The top plate 226 further includes a rear edge 288 which is bent outwardly. The bottom plate 228 has the same structure as the top plate 226, but is oppositely oriented with respect to the side panels 218. The rear edge 288 of the top and bottom plates, together with the front end edges 270 of the side panels 218, form the flange surrounding the open end of the V-shaped housing 212 for mounting the structure 210 to air handling equipment.

Figure 11:
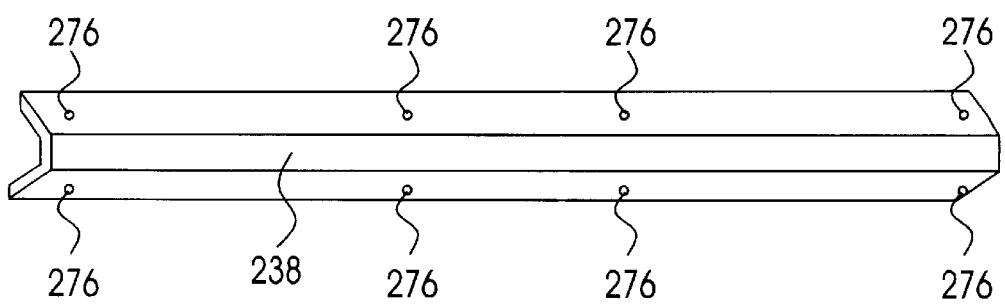
FIG. 11 is a perspective view of an end wall of the air filter shown in FIG. 8.

FIG. 11 illustrates the front wall 238 in perspective view. The front wall is also preferably made from a sheet metal blank using a pressing, stamping or bending process. Assembly bores 276 are provided in the front wall 238 correspondence with bores 276 in the top and bottom plates 226, 228 (FIG. 10) so that the front wall can be mounted to the respective top and bottom plates using rivets or screws to form the closed narrow end 214 (FIG. 8) of the V-shaped housing.

The advantage of the structures 10 and 210 is that they are constructed entirely from sheet metal blanks or welded wire structures that may be prepared for assembly using automated machinery. Consequently, sub-assembly is eliminated and high efficiency electrostatic air filters may be rapidly and inexpensively assembled with a minimum amount of time and labour. A further advantage of the structures 10 and 210 is that the structures are more robust than prior art constructions, and are therefore better suited for commercial applications. The structures 10 and 210 also eliminate the face-loading common in dusty environments where filters with wire mesh faces are used. The structures assembled using welded wire also have a further advantage, because air pressure drop is reduced due to the open face and the fact that the welded wires run parallel, rather than perpendicular, to air flow through the filter structure. The structures 10 and 210 therefore provide superior structures for electrostatic air filters that are adapted for use in a wide range of air handling equipment.

We claim:

1. A structure for an electrostatic V-bank air filter, comprising:

a pair of substantially triangular side panels;

a perforated electrically conductive top plate and a perforated electrically conductive bottom plate;

either one of side panels and the top and bottom plates having respective angled side edges adapted to mount the top and bottom plates transversely to the side panels to form a substantially V-shaped housing;

a pair of electrically conductive enclosure plates for respectively forming a rectangular enclosure in combination with a one of the top plate and the bottom plate, the enclosure plates respectively supporting an electrostatic filter pad when the enclosure plates are in a closed position, each enclosure plate being movable to an open position in which the electrostatic filter pad can be removed for replacement;

locking mechanisms respectively adapted to detachably secure the pair of enclosure plates in the closed position; and electrodes adapted to deliver an electric charge to the respective electrostatic filter pads when the enclosure plates are in the closed position.

2. A structure as claimed in claim 1 wherein the side panels respectively includes an inner side, an outer side and the angled side edges are disposed at a right angle with respect to either one of the inner and outer sides.

3. A structure as claimed in claim 1 wherein the substantially triangular side panels are truncated and a rear wall is mounted to the top and bottom plates at the truncated ends of the side panels to form a closed narrow end of the structure.

4. A structure as claimed in claim 1 wherein each of the enclosure plates includes a top face, a bottom face, two side edges bent at a right angle with respect to either one of the top face and the bottom face, and bores that pierce each of the side edges in an aligned relationship for accepting a hinge pin inserted through corresponding bores in the side panels so that the enclosure plates are pivotally mounted to the side panels in parallel relationship with the top and bottom plates to permit pivotal movement from the closed position to the open position.

5. A structure as claimed in claim 4 wherein the corresponding bores are located near a wide end of the respective side panels.

6. A structure as claimed in claim 4 wherein the corresponding bores are located near a narrow end of the respective side panels.

7. A structure as claimed in claim 1 wherein each of the enclosure plates comprises a welded wire structure having a wire front edge, a wire rear edge and a plurality of spaced-apart parallel wires respectively welded to the wire front and rear edges.

8. A structure as claimed in claim 7 wherein the wire rear edge extends beyond opposite sides of the welded wire structure to form a hinge pin received in bores in the respective side panels to pivotally mount the enclosure plates to the side panels.

9. A structure as claimed in claim 8 wherein the bores which receive the hinge pin are located near a wide end of the respective triangular side panels.

10. A structure as claimed in claim 8 wherein the bores which receive the hinge pin are located near a narrow end of the respective triangular side panels.

11. A structure as claimed in claim 1 wherein the enclosure plate adapted to form the rectangular enclosure with the top panel includes a top face, a bottom face, two side edges disposed at a right angle with respect to the bottom face for connection with a hinge pin that is supported by the respective side panels, a rear end edge disposed at a right angle with respect to the bottom face, and a front edge disposed at a right angle with respect to the top face to close a front end of the rectangular enclosure when the enclosure plate is in the closed position; and wherein the enclosure plate adapted to form the rectangular enclosure with the bottom panel include s a top face, a bottom face, two side edges disposed at a right angle with respect to the top face for mounting a hinge pin thereto that is supported by the respective side panels, a rear end edge disposed at a right angle with respect to the top face, and a front edge disposed at a right angle with respect to the bottom face to close a front end of the rectangular enclosure when the enclosure plate is in the closed position against the bottom panel.

12. A structure as claimed in claim 1 further comprising a mounting flange surrounding the open end, the mounting flange being formed by an outwardly disposed front edge of the top and bottom plates and an outwardly disposed front edge of each of the side panels.

13. A structure as claimed in claim 11 wherein each of the side panels, top and bottom plates, and enclosure plates is made of a sheet metal blank, the respective edges disposed at right angles being bent using a metal bending process.

14. A structure as claimed in claim 1 wherein the electrodes are respectively mounted to but insulated from the top plate and the bottom plate at an end with respect to which the respective enclosure plates are opened to replace the electrostatic filter pad.

15. A structure as claimed in claim 14 wherein the electrodes are respectively mounted to inner surfaces of the top and bottom plates when the respective enclosure plates are pivotally mounted to a narrow end of the triangular side panels.

16. A structure as claimed in claim 14 wherein the electrodes are respectively mounted to outer surfaces of the top and bottom plates when the respective enclosure plates are pivotally mounted to a wide end of the triangular side panels.

17. A structure as claimed in claim 1 wherein the locking mechanisms include at least two toggles respectively pivotally mounted to the top and bottom plates, the toggles being adapted to engage the enclosure plates in a locked position and disengage the enclosure plates in an unlocked position.

18. A structure as claimed in claim 1 wherein the locking mechanisms comprise at least two spring clips respectively mounted to the top and bottom plates, the spring clips being adapted to engage the enclosure plates in a locked position and disengage the enclosure plates in an unlocked position.

19. A structure for an electrostatic V-bank air filter, comprising:
a substantially V-shaped housing having an open, wide front end, a narrow, closed rear end, a perforated top plate, a perforated bottom plate, a rear wall and a pair of side panels, each side panel being a truncated triangular shape and constructed from a sheet metal blank with side edges and a rear edge bent at a right angle with respect to one side thereof while a front edge is bent in an opposite direction, each of the top and bottom plates being rectangular and constructed from a sheet metal blank with a front edge bent outwardly and a rear edge bent inwardly, the top and bottom plates being respectively mounted transversely to the side edges of the side panels, and a rear wall that is constructed from a sheet metal blank and mounted to rear edges of the side panels and top and bottom plates to form the housing, the respective front edges of the side panels and the top and bottom plates forming a mounting flange surrounding the open end of the housing;
a pair of enclosure plates mounted in a parallel relation to the respective top and bottom plates and adapted to form a pair of rectangular enclosures for respectively supporting an electrostatic filter pad, each enclosure plate being rectangular and pivotally mounted at a rear end of the side edges to the side panels adjacent the rear wall so that the enclosure plate is independently pivotable from a closed position in which the rectangular enclosure is formed to a open position in which the electrostatic filter pad can be removed for replacement;
locking mechanisms located at the open end of the housing and the front edges of the enclosure plates to detachably secure the pair of enclosure plates in the closed position; and
electrodes mounted to the housing at the open end and adapted to deliver an electric charge to the respective electrostatic filter pads when the enclosure plates are in the closed position.

20. A structure as claimed in claim 19 wherein the pair of enclosure plates are constructed from a sheet metal blank with side edges and a rear edge bent at a right angle with respect to either surface thereof and a front edge bent at a right angle with respect to an opposite surface thereof.

21. A structure as claimed in claim 20 wherein the enclosure plates are pivotally mounted to the side panels by a hinge pin that is inserted through bores in the respective side panels and through aligned bores in a rear end of the side edges of the enclosure plates.

22. A structure as claimed in claim 19 wherein the enclosure plates are rectangular welded wire structures having a wire front edge, a wire rear edge with spaced-apart parallel wires respectively welded to the wire front edge and the wire rear edge.

23. A structure as claimed in claim 22 wherein the enclosure plates are pivotally mounted to the side panels by the wire rear edge which extends beyond each side edge of the welded wire structure and is received in bores in the respective side panels.

24. A structure for an electrostatic V-bank air filter, comprising:
a substantially V-shaped housing having an open, wide rear end, a narrow, closed front end, a perforated top plate, a perforated bottom plate, a front wall and a pair of side panels, each side panel being a truncated triangular shape and constructed from a sheet metal blank with a rear edge bent outwardly, each of the top and bottom plates being rectangular and constructed from a sheet metal blank with a rear edge bent outwardly and side edges bent at a right angle with respect to one side thereof, the top and bottom plates being respectively mounted transversely between the side edges to the side panels, and the front wall is constructed from a sheet metal blank with bent edges that are mounted to the top and bottom plates to form the housing, the respective rear edges of the side panels and the top and bottom plates forming a mounting flange surrounding the open end of the housing;
a pair of enclosure plates mounted to an outside of the housing in a parallel relation to the respective top and bottom plates and adapted to form a pair of rectangular enclosures for respectively supporting an electrostatic filter pad, each enclosure plate being rectangular and pivotally mounted at a rear end of the side edges to the side panels adjacent the mounting flange so that the enclosure plate is pivotable from a closed position in which the rectangular enclosure is formed to an open position in which the electrostatic filter pad can be removed for replacement;
locking mechanisms located at the front end of the housing and the front edges of the enclosure plates to detachably secure the pair of enclosure plates in the closed position; and
electrodes mounted to the front end of the housing and adapted to deliver an electric charge to the respective electrostatic filter pads when the enclosure plates are in the closed position.

25. A structure as claimed in claim 24 wherein each of the enclosure plates comprises a welded wire structure having a wire front edge, a wire rear edge and a plurality of spaced-apart parallel wires respectively welded to the wire front and rear edges.

26. A structure as claimed in claim 25 wherein the wire rear edge extends beyond opposite sides of the welded wire structure to form a hinge pin received in bores that pierce the side edges of the respective side panels.

27. A structure as claimed in claim 24 wherein each of the enclosure plates comprises a perforated sheet metal blank having a top face, a bottom face and two side edges disposed at a right angle with respect to one face for connection with a hinge pin that is supported by the respective side panels.

* * * * *